United States Patent Office 3,644,366
Patented Feb. 22, 1972

3,644,366
1-AMINO-3,4-DIHYDROISOQUINOLINES
Claude Jeanmart, Brunoy, Mayer Naoum Messer, Bievres, and Pierre Edouard Simon, Boulogne, France, assignors to Rhone-Poulenc S.A., Paris, France
No Drawing. Filed Mar. 5, 1969, Ser. No. 804,672
Claims priority, application France, Mar. 6, 1968, 142,607; Jan. 20, 1969, 6900907
Int. Cl. C07d 35/14
U.S. Cl. 260—286 R                8 Claims

ABSTRACT OF THE DISCLOSURE

The 3,4-dihydroisoquinoline derivatives of the formula:

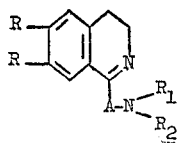

wherein the symbols R represent hydrogen, halogen or methoxy or together form a methylenedioxy group, A represents a single bond or a grouping

linked by the sulphur atom to the isoquinoline nucleus and $A_1$ represents an alkylene group of 1 through 5 carbon atoms, and $R_1$ and $R_2$ represent hydrogen, alkyl, halogenoalkyl, hydroxyalkyl, cyanoalkyl, dialkylaminoalkyl, 4-methyl-1-piperazinylalkyl, aralkyl, amino, thioureido, or a C-linked nitrogen-containing 5- or 6-membered mononuclear heterocyclyl group, or $R_1$ and $R_2$ together with the nitrogen atom to which they are attached collectively represent a 5- or 6-membered mononuclear heterocyclic group, are useful as therapeutics, possessing in particular anti-tussive and anti-fibrillating properties.

---

This invention relates to new therapeutically useful derivatives of 3,4-dihydroisoquinoline, to processes for their preparation and pharmaceutical compositions containing them.

The new 3,4-dihydroisoquinoline derivatives of the present invention are those of the general formula:

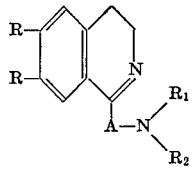

wherein the symbols R are the same or different and each represents a hydrogen or halogen (preferably chlorine) atom or a methoxy group or together form a methylenedioxy group, A represents a single bond or a grouping

linked by the sulphur atom to the isoquinoline nucleus and $A_1$ represents an alkylene group having 1 to 5 carbon atoms, and $R_1$ and $R_2$ are the same or different and each represents a hydrogen atom or an alkyl, halogenoalkyl, hydroxyalkyl, cyanoalkyl, dialkylaminoalkyl, 4-methyl - 1 - piperazinylalkyl, aralkyl (preferably phenylalkyl), amino or thioureido group, or a C-linked nitrogen-containing 5- or 6-membered mononuclear heterocyclyl group, or $R_1$ and $R_2$ together with the nitrogen atom to which they are attached collectively represent a 5- or 6- membered mononuclear heterocyclic group, which may include a second hetero-atom selected from nitrogen, oxygen and sulphur atoms and optionally carry one or more alkyl groups, the mononuclear heterocyclic groups preferably being pyrrolidinyl, piperidinyl, piperazinyl or N-alkylpiperazinyl, and acid addition and quaternary ammonium salts thereof. It is to be understood that in this specification and accompanying claims the alkyl groups and alkyl moieties of groups within the definitions of symbols $R_1$ and $R_2$ contain 1 to 5 carbon atoms, and preferably at most 3 carbon atoms.

According to a feature of the invention, the 3,4-dihydroisoquinoline derivatives of Formula I wherein A represents a single bond are prepared by the process which comprises reacting ammonia or an amine of the general formula:

(wherein $R_1$ and $R_2$ are as hereinbefore defined) with a 3,4-dihydroisoquinoline derivative of the general formula:

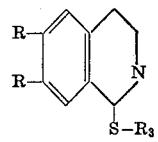

wherein $R_3$ represents an alkyl group containing 1 to 3 carbon atoms and the symbols R are as hereinbefore defined, or an acid addition salt thereof, preferably the hydroiodide.

When the 3,4-dihydroisoquinoline starting material of Formula III is used in the form of the free base, the reaction is preferably effected by heating the reactants in an inert organic solvent such as ethanol, toluene or dimethylformamide, at a temperature between 50° C. and the boiling point of the reaction mixture. It is particularly advantageous to carry out the reaction under an inert atmosphere such as a nitrogen atmosphere. The reaction is generally complete after a heating period of between 10 and 30 hours.

When the starting material of Formula III is used in the form of an acid addition salt, it is preferable to carry out the reaction in an alcohol, for example ethanol, and at a temperature between 50° and 80° C. for 30 minutes to 10 hours.

3,4-dihydroisoquinoline derivatives of Formula III used as starting materials may be obtained according to the method described by M. Lora-Tamayo et al, Tetrahedron, suppl. No. 8 (part 1), page 303 (November 1966).

The 3,4-dihydroisoquinoline derivatives of Formula III can also be obtained by cyclisation of an isothiocyanate of the general formula:

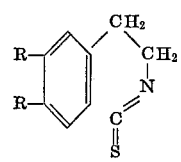

(wherein the R symbols are as hereinbefore defined) followed by S-alkylation in manner known per se of the resulting 3,4-dihydroisothiocarbostyril. The cyclisation of the isothiocyanate is generally effected by heating in sulphuric acid or polyphosphoric acid, or by the action of aluminum chloride in n-heptane.

The 3,4-dihydroisoquinoline derivatives of Formula I wherein A represents a grouping

$A_1$ being as hereinbefore defined, are prepared according to further features of the invention by the following processes:

(a) By the reaction of a reactive ester of the general formula:

V (wherein X represents a halogen atom and $A_1$, $R_1$ and $R_2$ are as hereinbefore defined) with an alkali metal derivative of an isoquinoline of the formula:

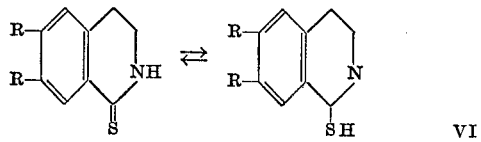

VI wherein the R symbols are as hereinbefore defined. The alkali metal derivative of the isoquinoline is generally prepared in situ by reaction of an alkali metal alkoxide with the isoquinoline at a temperature below 20° C.

The reaction between the reactive ester of Formula V and the alkali metal derivative of the isoquinoline of Formula VI is advantageously carried out in an inert organic solvent, for example acetone, at a temperature below 25° C.

(b) By the reaction of a thiocyanate of the general formula:

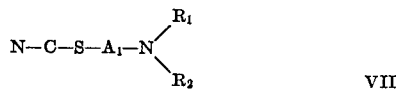

VII (wherein $A_1$, $R_1$ and $R_2$ are as hereinbefore defined) with a phenethyl halide of the general formula:

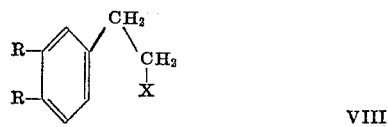

VIII wherein the symbols R and X are as hereinbefore defined.

The reaction is effected in the presence of a Lewis acid such as stannic chloride ($SnCl_4$), optionally in an inert organic solvent, for example hexane, and at a temperature between 50° and 150° C.

The reaction can be schematically represented as follows:

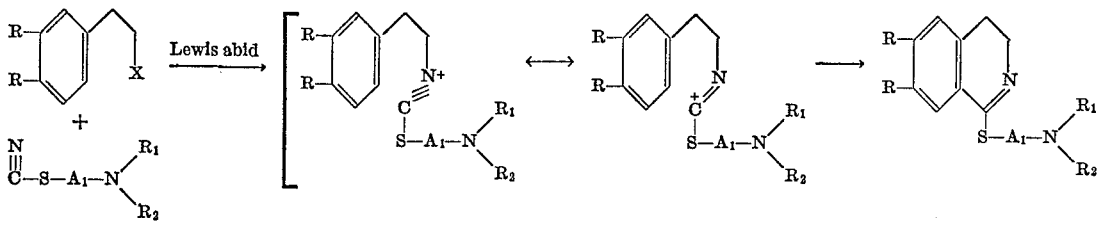

According to a still further feature of the invention, the 3,4-dihydroisoquinoline derivatives of Formula I, wherein either or both of $R_1$ and $R_2$ represent a halogenoalkyl group, are prepared by halogenation, according to methods known per se, of a corresponding 3,4-dihydroisoquinoline derivative of Formula I wherein either or both of $R_1$ and $R_2$ represent a hydroxyalkyl group. The halogenation can be carried out, for example, by means of a thionyl halide, e.g. thionyl chloride. By "methods known per se" as used in this specification is meant methods heretofore used or described in the chemical literature.

The 3,4-dihydroisoquinoline derivatives of general Formula I obtained by the aforementioned processes may be purified by physical methods such as distillation, crystallisation or chromatography, or by chemical methods such as the formation of salts, crystallisation of the salts and decomposition of them in an alkaline medium. In carrying out the said chemical methods, the nature of the anion of the salt is immaterial, the only requirement being that the salt must be well-defined and readily crystallisable.

The 3,4-dihydroisoquinoline derivatives of Formula I may be converted in manner known per se into acid addition and quaternary ammonium salts. The acid addition salts may be obtained by the action of acids on the isoquinoline derivatives in appropriate solvents. As organic solvents there may be used, for example, alcohols, ethers, ketones or chlorinated hydrocarbons. The salt which is formed is precipitated, if necessary after concentration of its solution, and is separated by filtration or decantation. The quaternary ammonium salts may be obtained by the action of esters on the isoquinoline bases, optionally in an organic solvent, at room temperature or, more rapidly, with gentle heating.

The 3,4-dihydroisoquinoline derivatives of the present invention, and their acid addition and quaternary ammonium salts, possess interesting pharmacodynamic properties; they are very active as anti-tussive agents. They have given good results in physiological experiments on animals at doses of between 0.5 and 10 mg./kg. animal body weight when administered intravenously and of between 10 and 50 mg./kg. animal body weight when administered orally, in particular in the case of guinea pigs in which coughing is provoked by the inhalation of aerosols of citric acid.

They also possess valuable anti-fibrillating properties. In vitro, at concentrations of between 1 and 10 mg./litre, they have shown themselves active in a study of the prolongation of the refractory period of the isolated auricles of the rabbit [G.S. Dawes, Brit. J. Pharmacol., 1, 90 (1946)]. In vivo the products have proved active in rabbits against electrocardiographic abnormalities caused by aconitine, and in guinea pigs against the cardiac toxicity of ouabain [A. Sekiya and E.M. Vaughan Williams, Brit. J. Pharmacol., 21, 462 (1963)] at doses of between 0.5 and 10 mg./kg. animal body weight administered intravenously.

Preferred 3,4-dihydroisoquinoline derivatives of the present invention are those of general Formula I in which $R_1$ and $R_2$ both represent hydrogen atoms or alkyl groups, or $R_1$ represents an alkyl, halogenoalkyl, hydroxyalkyl, cyanoalkyl, dialkylaminoalkyl, 4-alkyl - 1 - piperazinylalkyl, phenylalkyl, amino or thioureido group, or a C-linked heterocyclyl group selected from pyrrolidinyl, piperidyl, piperazinyl and N-alkylpiperazinyl groups, and $R_2$ represents a hydrogen atom, or the grouping

—$NR_1R_2$ represents a 1 - pyrrolidinyl, piperidino, 1 - piperazinyl or N - alkyl - 1 - piperazinyl group, and especially those compounds in which A represents a single bond or the thioethylene (i.e. —$SCH_2CH_2$—) group and their acid addition and quaternary ammonium salts.

The isoquinoline derivatives of general Formula I which are the most interesting for their anti-tussive effect are 1 - (2 - diethylamino - ethylamino) - 3,4 - dihydroisoquinoline and 1 - amino - 3,4 - dihydroisoquinoline. The most interesting for their anti-fibrillating activity are 1 - (2 - diethylamino - propylamino) - 3,4 - dihydroisoquinoline and 1 - (2 - diethylamino - ethylamino)-3,4-dihydroisoquinoline.

For therapeutic purposes, the 3,4-dihydroisoquinoline derivatives of general Formula I may be employed as such or in the form of non-toxic acid addition salts, i.e. salts containing anions which are relatively innocuous to the animal organism in therapeutic doses of the salts (such as hydrochlorides, sulphates, nitrates, phosphates, acetates, propionates, succinates, benzoates, fumarates, maleates, tartrates, theophyllineacetates, salicylates, phenolphthalinates and methylene - bis - β - hydroxynaphthoates) so that the beneficial physiological properties inherent in the bases are not vitiated by side-effects ascribable to the anions. However, they may also be employed in the form of non-toxic quaternary ammonium salts obtained by reaction with organic halides e.g. methyl, ethyl, allyl or benzyl chloride, bromide or iodide, or other reactive esters, e.g. methyl- or ethylsulphates, benzene sulphonates or toluene-p-sulphonates.

The following examples illustrate the invention.

EXAMPLE 1

A solution of 1-propylthio-3,4-dihydroisoquinoline (15 g.) in a 40% (40 g. per 100 cc.) solution of dimethylamine in ethanol (150 cc.) is heated under reflux in a nitrogen atmosphere for 16 hours. The volatile products are removed by concentration under reduced pressure (30 mm. Hg), and the resulting oil (13.8 g.) is dissolved in acetone (50 cc.). A solution of anhydrous oxalic acid (7.1 g.) in acetone (50 cc.) is added. The product which crystallises is filtered off and washed with acetone (4× 20 cc.). 1-dimethyl-amino-3,4-dihydroisoquinoline oxalate (11.5 g.) is thus obtained which, after recrystallisation from acetonitrile, melts at 161° C.

1-propylthio-3,4-dihydroisoquinoline employed as starting material can be prepared according to M. Lora-Tamayo et al, Tetrahedron, suppl. No. 8 (part 1), page 303 (November 1966).

EXAMPLE 2

A mixture of 1-methylthio-3,4-dihydroisoquinoline (10 g.), 2-diethylamino-ethylamine (26 g.) and dimethylformamide (25 cc.) is heated for 16 hours at 113° C. under a nitrogen atmosphere. Water (200 cc.) is then added and the oil which separates out is extracted with diethyl ether (1× 100 cc. followed by 2× 50 cc.). The combined organic extracts are washed with water (2× 50 cc.) and then dried over sodium sulphate. The solvent is evaporated under reduced pressure (30 mm. Hg) and the residual oil (11.6 g. is dissolved in acetone (300 cc.). A 3.7 N ethereal solution of dry hydrogen chloride (25 cc.) is then added to this solution. A product crystallises and is filtered off and washed with acetone (4× 15 cc.). 1-(2-diethylamino-ethylamino) - 3,4 - dihydroisoquinoline dihydrochloride (13.6 g.), melting at 232–235° C. (with decomposition), is thus obtained.

1-methylthio-3,4-dihydroisoquinoline employed as starting material can be prepared according to M. Lora-Tamayo, Tetrahedron, suppl. No. 8 (part 1), page 303 (November 1966).

EXAMPLE 3

A solution of 1-methylthio-3,4-dihydroisoquinoline (40 g.) and 1-methylpiperazine (90 g.) in dimethylformamide (100 cc.) is heated under a nitrogen atmosphere for 20 hours at 130° C. Water (800 cc.) is then added and the product which separates out is extracted with ethyl acetate (1× 250 cc. followed by 3× 150 cc.). The combined organic layers are dried over sodium sulphate. The solvent is evaporated under reduced pressure (30 mm. Hg), and the resulting oil (41 g.) is taken up in a solution of sulphuric acid (d=1.83; 17 cc.) in ethanol (510 cc.). A product crystallises and is filtered off and washed with ethanol (2× 25 cc.). It is recrystallised from ethanol (650 cc.) to yield 39 g. of product melting at 248–250° C.

The crystalline product (39 g.) is dissolved in water (80 cc.). Methylene chloride (100 cc.) is added followed slowly by sodium hydroxide solution (d=1.33; 37 cc.). The organic phase is decanted and the aqueous layer is extracted with methylene chloride (50 cc. followed by 25 cc.). The combined organic layers are washed with water (25 cc.) and then dried over sodium sulphate. The solvent is evaporated under reduced pressure (30 mm. Hg) to give an oil (20.6 g) which is triturated with heptane (15 cc.) and filtered. Crystalline 1-(4-methyl-1-piperazinyl)-3,4-dihydroisoquinoline (16 g.), melting at 62–63° C., is thus obtained.

EXAMPLE 4

A solution of 1-methylthio-3,4-dihydroisoquinoline (10 g.) in 1-diethylamino-2-aminopropane (29.2 g.) and dimethylformamide (25 cc.) is heated under reflux in a nitrogen atmospheref or 20 hours. The mixture is poured into water (200 cu.) and the oil which separates out is extracted with diethyl ether (2× 100 cc.). The combined organic layers are washed with water (2× 100 cc.) and then dried over sodium sulphate. The solvent is evaporated under reduced pressure (30 mm. Hg). The resulting oil (16 g.) is dissolved in isopropanol (50 cc.) and a solution of fumaric acid (13 g.) in isopropanol (200 cc.) is added. The resulting crystals are filtered off and washed with acetone (2× 20 cc.) to give 1-(1-diethylamino-2-propylamino)-3,4-dihydroisoquinoline fumarate (19 g.) melting at 172° C. and then at 176° C.

EXAMPLE 5

A solution of 1-methylthio-3,4-dihydroisoquinoline (15 g.) in 3-dimethylamino-propylamine (34 g.) and dimethylformamide (38 g.) is heated under reflux under a nitrogen-atmosphere for 18 hours. The mixture is poured into a solution of sodium chloride (130 g.) in water (300 cc.); an oil separates out and is extracted with diethyl ether (150 cc. followed by 160 cc.). The combined organic layers are washed with a saturated aqueous sodium chloride solution (50 cc.) and then dried over sodium sulphate. The solvent is evaporated under reduced pressure (30 mm. Hg) and the resulting oil (19.5 g.) is dissolved in isopropanol (100 cc.). A solution of fumaric acid (16.3 g.) in isopropanol (250 cc.) is added. The resulting crystals are filtered off and washed with isopropanol (2× 10 cc.) and then with acetone (2× 20 cc.) to give 1-(3-dimethylamino-propylamino) - 3,4 - dihydroisoquinoline fumarate (25.5 g.) melting at 160–162° C.

EXAMPLE 6

A solution of 1-methylthio-3,4-dihydroisoquinoline hydroiodide (35 g.) and benzylamine (49.2 g.) in toluene (150 cc.) is heated under reflux in a nitrogen atmosphere for 16 hours. The suspension thus obtained is taken up in water (200 cc.) and 4 N sodium hydroxide solution (30 cc.); the organic phase is decanted and the aqueous phase is extracted with diethyl ether (2× 100 cc.). The combined organic layers are washed with water (1× 500 cc. followed by 4× 200 cc.) and dried over sodium sulphate. The solvents are evaporated under reduced pressure (30 mm. Hg) and the resulting oil is dissolved in acetone (25 cc.), and a 4 N sulphuric acid solution (65 cc.) is then added. A product crystallises and is filtered off and washed with acetone (2× 25 cc.) to give 1-benzyl-amino-3,4-dihydroisoquinoline sulphate (20.8 g) melting at 215° C.

EXAMPLE 7

Sodium ethoxide (13 g.) is added in small portions to a solution of 3,4-dihydroisothiocarbostyril (31 g.) in acetone (310 cc.), whilst keeping the temperature below 18° C. A solution of 1 - chloro - 2-diethylaminoethane (52 g.) in acetone (50 cc.) is then added and the mixture is left to stand for 3 hours at 25° C. The volatile products are removed by distillation under reduced pressure (30 mm. Hg) and the residue is taken up in water (100 cc.) and diethyl ether (250 cc.). The organic layer is decanted, washed with water (3× 50 cc.) and then extracted with N hydrochloric acid (500 cc.). The aqueous acid fraction is treated with decolourising charcoal (2 g.), filtered and the filtrate rendered alkaline with sodium hydroxide solution ($d=1.33$; 50 cc.). An oil separates out which is extracted with diethyl ether (200 cc. followed by 50 cc.). The combined organic layers are dried over sodium sulphate, and the solvent is evaporated under reduced pressure (30 mm. Hg). The resulting oil (54 g.) is dissolved in ethanol (250 cc.) and a solution of sulphuric acid ($d=1.83$; 20.4 cc.) in ethanol (250 cc.) is added. The resulting crystals are filtered off and washed with ethanol (4× 20 cc.) to give the acid disulphate of 1 - (2 - diethylamino-ethylthio) - 3,4-dihydroisoquinoline (40.8 g.) melting at 163–164° C.

3,4 - dihydroisothiocarbostyril employed as starting material can be prepared according to P.A.S. Smith et al., J. Amer. Chem. Soc., 82, 4753, (1960).

EXAMPLE 8

Stannic chloride (234 g.) is added over the course of 45 minutes to a suspension of 1 - diethylamino-2-thiocyanatoethane hydrochloride (160 g.) in (2-chlorethyl)-benzene (127 g.). After this is done, the mixture is heated for 3 hours at 130° C. and is poured at 85° C. into water (1500 cc.). Diethyl ether (1000 cc.) and sodium hydroxide solution ($d=1.33$; 480 cc.) are then added; the organic layer is decanted and the aqueous layer is extracted with diethyl ether (2× 400 cc.). The combined organic layers are extracted with 4 N hydrochloric acid (400 cc. followed by 200 cc.). The combined acid extracts are treated with decolourising charcoal (7 g.), filtered and rendered alkaline with sodium hydroxide solution ($d=1.33$; 240 cc.). An oil separates out which is extracted with diethyl ether (400 cc. followed by 200 cc.). The combined organic layers are dried over sodium sulphate, and then the volatile products are first evaporated by heating on a water bath under 760 mm. Hg and then by heating at 180° C. under reduced pressure (0.1 mm. Hg). The residue (64 g.) is taken up in petroleum ether (boiling point 40–65° C.; 700 cc.) and filtered through a column containing alumina (600 g.). Elution is carried out with a mixture of petroleum ether-methylene chloride (1800 cc.) containing 10% of methylene chloride, and an oil (29 g.) is collected which is dissolved in ethanol (200 cc.). Sulphuric acid ($d=1.83$; 11.1 cc.) dissolved in ethanol (73 cc.) is then added. A product crystallises and is filtered off, and washed with ethanol (5× 10 cc.) to give the acid disulphate of 1 - (2-diethylamino-ethylthio)- 3,4-dihydroisoquinoline (39.7 g.) melting at 164–165° C.

1 - diethylamino - 2 - thiocyanatoethane employed as starting material can be prepared according to A. Calderbank and R. Ghosh, J. Chem. Soc., 1960, 637.

EXAMPLE 9

A solution of 1 - methylthio - 3,4 - dihydroisoquinoline (20.2 g.) and ammonium iodide (15.9 g.) in a 1.6 N solution of ammonia in ethanol (100 cc.) is heated under reflux for 1 hour 30 minutes. The mixture is poured into diethyl ether (1000 cc.) and the product which crystallises is filtered off and washed with diethyl ether (2× 100 cc.) to give 1 - amino - 3,4-dihydroisoquinoline hydroiodide (24.8 g.) melting at 118° C.

EXAMPLE 10

A solution of 1 - methylthio - 3,4-dihydroisoquinoline (14.2 g.) and of 1 - methyl - 4-(3-aminopropyl)-piperazine (50 g.) in dimethylformamide (35 cc.) is heated at 150° C. for 18 hours under a nitrogen atmosphere. Water (400 cc.) is then added and the slight amount of insoluble matter which has precipitated is filtered off. The cloudy solution is extracted with methylene chloride (3× 150 cc.), and the combined organic layers are washed with water (100 cc.) and then dried over sodium sulphate. The solvent is evaporated under reduced pressure (30 mm. Hg) and the oil (27 g.) obtained is taken up in cyclohexane (200 cc.). The solution is filtered through filtered paper and then passed through a column containing silica (230 g.). After passing methylene chloride (5000 cc.) followed by a mixture of methanol (350 cc.) and methylene chloride (6650 cc.) through the column, the silica is poured into water (300 cc.) and acidified to pH 1 by addition of 12 N hydrochloric acid. The silica is filtered off and the filtrate is rendered alkaline to pH 11 by addition of 10 N sodium hydroxide solution. The cloudy aqueous solution is filtered through filter paper and then extracted with methylene chloride (3× 150 cc.). The combined methylene chloride extracts are washed with water (100 cc.) and dried over sodium sulphate. The solvent is evaporated under reduced pressure (30 mm. Hg) and the resulting oil (11 g.) is dissolved in ethanol (35 cc.). This solution is added to a solution of fumaric acid (13.4 g.) in hot ethanol (185 cc.); the product which crystallises is separated and recrystallised from methanol (500 cc.) to give 1 - [3-(4-methyl-1-piperazinyl)propylamino] - 3,4 - dihydroisoquinoline trifumarate (18 g.) melting at 188–190° C.

1 - methyl - 4 - (3-aminopropyl)piperazine employed as starting material can be prepared according to M. Friefelder, J. Amer. Chem. Soc., 82, 2386 (1960).

EXAMPLE 11

A solution of 1 - methylthio - 3,4 - dihydroisoquinoline hydroiodide (50 g.) and of ethanolamine (11 g.) in ethanol (500 cc.) is heated under reflux for 45 minutes. The product which crystallises is filtered off and washed with diethyl ether (4× 50 cc.) to give 1-(2-hydroxyethylamino)-3,4-dihydroisoquinoline hydroiodide (43.1 g.) melting at 184° C. The product thus obtained is dissolved in water (2000 cc.) rendered alkaline by addition of 10 N sodium hydroxide solution (50 cc.), and the aqueous phase is extracted with ethyl acetate (2× 400 cc.). Sodium chloride (600 g.) and 10 N sodium hydroxide solution (100 cc.) are then added to the aqueous phase; an oil separates out and is extracted with ethyl acetate (2× 300 cc.). These latter organic extracts are combined and dried over sodium sulphate. The solvent is evaporated under reduced pressure (30 mm. Hg) to give 1-(2-hydroxyethylamino) - 3,4 - dihydroisoquinoline (18.6 g.) melting at 110–111° C.

EXAMPLE 12

A solution of 1 - methylthio - 3,4 - dihydroisoquinoline hydroiodide (35 g.) and 2-aminopyridine (11.9 g.) in ethanol (350 cc.) is heated under reflux for 1 hour. The solvent is evaporated under reduced pressure (30 mm. Hg) and the resulting oil (41.9 g.) is taken up in water (120 cc.) and 10 N sodium hydroxide solution (80 cc.). An oil separates out which is extracted with diethyl ether (200 cc. followed by 100 cc.). The combined organic layers are washed with water (100 cc.) and then dried over potassium carbonate. The solvent is evaporated under reduced pressure (30 mm. Hg) and the oil thus obtained (25.3 g.) is taken up in acetone (240 cc.) and a 4 N ethereal solution of hydrochloric acid (25 cc.). The product which crystallises is filtered off and washed with acetone (3× 10 cc.) to give 1-(2-pyridylamino)-3,4-dihydroisoquinoline hydrochloride (12.1 g.) decomposing at 250° C.

EXAMPLE 13

A solution of 1 - methylthio - 3,4 - dihydroisoquinoline hydroiodide (38 g.) and of pure monomethylamine (11.9 g.) in ethanol (200 cc.) is heated under reflux for 1 hour. The product which crystallises is filtered off and washed with ethanol (25 cc.) to give 1-methylamino-3,4-dihydroisoquinoline hydroiodide (18.9 g.) melting at 184° C. and then at 197° C.

The organic mother liquors are evaporated under reduced pressure (30 mm. Hg) and the crystalline residue is taken up in diethyl ether (50 cc.). The crystalline product is filtered off and washed with diethyl ether (25 cc.) to give 1 - methylamino - 3,4 - dihydroisoquinoline hydroiodide (16.3 g.) melting at 184° C. and then at 197° C.

1 - methylamino - 3,4 - dihydroisoquinoline hydroiodide (34 g.) is dissolved in water (850 cc.) and the cloudy solution is treated with decolourising charcoal (2 g.) and filtered. The filtrate is rendered alkaline by addition of 10 N sodium hydroxide solution (25 cc.), and the oil which separates out is extracted with methylene chloride (2× 250 cc.). The combined organic layers are dried over sodium sulphate and the solvent is evaporated under reduced pressure (30 mm. Hg); a product crystallises. 1 - methylamino - 3,4 - dihydroisoquinoline (17.4 g.), melting at 85° C., is thus obtained.

EXAMPLE 14

Hydrazine hydrate (153 g.) is added over the course of 45 minutes to a solution of 1-methylthio-3,4-dihydroisoquinoline hydroiodide (30 g.) in ethanol (300 cc.) under reflux. After heating for 1 hour, the solvent is evaporated under reduced pressure (30 mm. Hg) and the resulting oil is dissolved in water (150 cc.); a solid separates out which is filtered off and washed with water (2× 10 cc). The aqueous solution is treated with decolourising charcoal and filtered, and the filtrate is rendered alkaline by addition of 10 N sodium hydroxide solution (30 cc.). The oil which separates out is extracted with methylene chloride (2× 150 cc.). The combined organic layers are dried over sodium sulphate and the solvent is evaporated under reduced pressure (30 mm. Hg); a product crystallises. 1 - hydrazino - 3,4 - dihydroisoquinoline (11.8 g.), melting at 58° C., is thus obtained.

EXAMPLE 15

A solution of 1 - methylthio - 3,4 - dihydroisoquinoline hydroiodide (21.4 g.), 93% 2-diethylamino-propylamine (10.8 g.) and 7.8 N hydroiodic acid (9.8 cc.) in ethanol (200 cc.) is heated under reflux for 1 hour. The product which crystallises is filtered off and washed with ice-cold ethanol (4× 10 cc.) to give 1-(2-diethylamino-propylamino) - 3,4 - dihydroisoquinoline dihydroiodide (32.6 g.) melting at 223–225° C.

2-diethylamino-propylamine employed as starting material can be prepared according to V. Prelog, Helv. Chim. Acta, 26, 1172 (1943).

EXAMPLE 16

A solution of 1 - methylthio - 3,4 - dihydroisoquinoline hydroiodide (24.5 g.) and of 1-phenylethylamine (10.2 g.) in ethanol (200 cc.) is heated under reflux for 1 hour. The solvent is evaporated under reduced pressure (30 mm. Hg) and the resulting oil is dissolved in ethyl acetate (50 cc.). After standing for 48 hours at 20° C., the crystalline product is filtered off and washed with ethyl acetate (2× 5 cc.). 1-(1-phenylethylamino)-3,4-dihydroisoquinoline hydroiodide (22.6 g.), melting at 185–187° C., is thus obtained.

EXAMPLE 17

A suspension of 1-methylthio-3,4-dihydroisoquinoline hydroiodide (30.5 g.) and of thiosemicarbazide (10 g.) in ethanol (100 cc.) is heated under reflux for 1 hour 30 minutes. The product which crystallises is filtered off and washed with diethyl ether (3× 50 cc.) to give 1-thiosemicarbazido - 3,4 - dihydroisoquinoline hydroiodide (27.5 g.) melting at 240–250° C. with decomposition.

EXAMPLE 18

A mixture of 1-methylthio-3,4-dihydroisoquinoline hydroiodide (46 g.), triethylamine (15 g.), and 3-aminopropionitrile hydrochloride (16 g.) in ethanol (180 cc.) and diethyl ether (90 cc.) is heated with distillation of the ether over the course of 12 minutes. The cloudy solution is filtered, and a product crystallises from the filtrate. This is filtered off and washed with ethanol (5× 10 cc.) to give 1-(2-cyanoethylamino)-3,4-dihydroisoquinoline hydroiodide (30 g.), melting at 216–217° C. after recrystallisation from a mixture of methanol-diethyl ether.

EXAMPLE 19

A solution of 1-methylthio-3,4-dihydroisoquinoline hydroiodide (250 g.) and 3-aminopropanol (67.5 g.) in ethanol (1500 cc.) is heated under reflux for 1 hour 30 minutes. The product which crystallises is filtered off and washed with ethanol (2× 150 cc.) to give 1-(3-hydroxypropylamino)-3,4-dihydroisoquinoline hydroiodide (165 g.) melting at 135–136° C.

EXAMPLE 20

A solution of 1-(3-hydroxypropylamino)-3,4-dihydroisoquinoline (19.2 g.) in thionyl chloride (96 cc.) is heated under reflux for 30 minutes. The reaction mixture is concentrated under reduced pressure (30 mm. Hg) and the resulting oil (33 g.) is taken up in acetone (3× 25 cc.). 1 - (3-chloropropylamino)-3,4-dihydroisoquinoline hydrochloride (12.3 g.), melting at 166–168° C., is thus obtained.

EXAMPLE 21

A solution of 1-methylthio-3,4-dihydroisoquinoline hydroiodide (50 g.) and of 1-amino-2-propanol (12.3 g.) in ethanol (300 cc.) is heated under reflux for 1 hour. Diethyl ether (600 cc.) is then added. The product which crystallises is filtered off and washed with diethyl ether (2× 50 cc.) to give 1-(2-hydroxypropylamino)-3,4-dihydroisoquinoline hydroiodide (33.8 g.) melting at 150° C. The corresponding base melts at 104° C.

EXAMPLE 22

A solution of 1-methylthio-6,7-dimethoxy-3,4-dihydroisoquinoline (13.2 g.), 2-dimethylamino-ethylamine (7.7 g.) and 7.8 N hydroiodic acid (17 cc.) in ethanol (132 cc.) is heated under reflux for 30 minutes. The product which crystallises is filtered off and washed with ethanol (4× 10 cc. to give 1-(2-diethylamino-ethylamino)-6,7-dimethoxy - 3,4 - dihydroisoquinoline dihydroiodide (27 g.) melting at 225° C.

1 - methylthio - 6,7-dimethoxy-3,4-dihydroisoquinoline employed as starting material can be prepared in the following manner:

A suspension of 6,7-dimethoxy-3,4-dihydroisothiocarbostyril (59 g.) and of methyl iodide (113 g.) in acetonitrile (600 cc.) is heated under reflux for 1 hour. The product which crystallises is filtered off and washed with acetonitrile (2× 25 cc.) to give 1-methylthio-6,7-dimethoxy-3,4-dihydroisoquinoline hydroiodide (87.5 g.) melting at 196° C.

6,7-dimethoxy-3,4-dihydroisothiocarbostyril can be obtained by cyclisation of 2-(3,4-dimethoxyphenyl)ethyl isothiocyanate (60 g.) by heating in polyphosphoric acid (300 g.) for 1 hour at 60° C. The mixture is then poured into water (1600 cc.). The product which crystallises is filtered off and washed with water (7× 350 cc.) to give 6,7 - dimethoxy - 3,4-dihydroisothiocarbostyril (58.4 g.) melting at 218° C.

2-(3,4-dimethoxyphenyl)ethyl isothiocyanate can be prepared by addition of 10 N sodium hydroxide solution (280 cc.), with stirring, to a mixture of 2-(3,4-dimethoxyphenyl)ethylamine (163 g.), 12 N hydrochloric acid (84 cc.) and thiophosgene (115 g.) in water (900 cc.) and methylene chloride (900 cc.), the temperature being kept at about 18° C. and the pH near the neutral point. The organic layer is separated and the solvent is evaporated under reduced pressure (30 mm. Hg). The residual oil is distilled under reduced pressure to give 2-(3,4-dimethoxyphenyl)ethyl isothiocyanate (185 g.) boiling at 166–185° C. under 0.5 mm. Hg.

2 - (3,4-dimethoxyphenyl)ethylamine can be prepared according to J.C. Robinson and H. R. Snyder, Organic Syntheses Coll., vol. III, p. 720, J. Wiley Edit. (1955).

EXAMPLE 23

A suspension of 1-methylthio-6,7-dimethoxy-3,4-dihydroisoquinoline hydroiodide (25 g.) and of benzylamine (8 g.) in ethanol (250 cc.) is heated under reflux for 1 hour. The product which crystallises is filtered off. 1-benzylamino - 6,7 - dimethoxy - 3,4-dihydroisoquinoline hydroiodide (25.5 g.), melting at 227–228° C., is thus obtained.

EXAMPLE 24

A solution of 1-methylthio-6,7-dimethoxy-3,4-dihydroisoquinoline hydroiodide (18.3), 3-dimethylaminopropylamine (5.6 g.) and 7.8 N hydroiodic acid (7.7 cc.) in ethanol (120 cc.) is heated under reflux for 30 minutes. The product which crystallises is filtered off, washed with ethanol (3× 15 cc.) and recrystallised from methanol (250 cc.) to give 1-(3-dimethylamino-propylamino)-6,7-dimethoxy-3,4-dihydroisoquinoline dihydroiodide (24.5 g.) melting at 253–254° C.

EXAMPLE 25

A suspension of 1-methylthio-6,7-methylenedioxy-3,4-dihydroisoquinoline hydroiodide (20 g.) in ethanol (125 cc.) is heated for 1 hour under reflux with 2-diethylamino-ethylamine (7.3 g.) and 7.8 N hydroiodic acid (8.1 cc.). After cooling, the crystalline product is filtered off and washed with ethaanol (3× 25 cc.). Crystals (28.8 g.), melting at a temperature above 260° C., are thus obtained. These crystals are suspended in distilled water (500 cc.) and methylene chloride (250 cc.). The pH is adjusted to about 11 by addition of 10 N sodium hydroxide solution (60 cc.). The organic phase is separated. The aqueous phase is extracted with methylene chloride (a further 250 cc.). The combined organic phases are washed with water (100 cc.) and then dried over sodium sulphate. The solvent is evaporated under reduced pressure (30 mm. Hg) and an orange oil (15.8 g.) is obtained. This oil is dissolved in isopropanol (170 cc.) and a 3.4 N etheral solution of hydrochloric acid (32 cc.) is added. The product which crystallises is filtered off, washed with isopropanol (2× 20 cc.) followed by diethyl ether (2× 40 cc.) and dried. A product (17.7 g.) is thus obtained which melts at 181–183° C. On recrystallisation from ethanol (70 cc.), 1-(2-diethylamino-ethylamino) - 6,7-methylenedioxy-3,4-dihydroisoquinoline dihydrochloride (16.3 g.), melting at 184–186° C., is obtained.

1 - methylthio-6,7-methylenedioxy-3,4-dihydroisoquinoline hydroiodide employed as starting material can be obtained by adding methyl iodide (29.4 g.) to a solution of 6,7-methylenedioxy-3,4-dihydroisothiocarbostyril (33 g.) in acetone (1800 cc.). After 18 hours, a product has crystallised and this is filtered off, washed with acetone (3× 100 cc.) and dried to give 1-methylthio-6,7-methylenedioxy-3,4-dihydroisoquinoline hydroiodide (45 g.) melting at 258–260° C.

6,7-methylenedioxy-3,4-dihydroisothiocarbostyril can be prepared by addition of 2-(3,4-methylenedioxyphenyl)-ethyl isothiocyanate (68.7 g.) to polyphosphoric acid (370 g.) with stirring for 1 hour 30 minutes at 35–40° C. The reaction mixture is then poured into water (1100 cc.) whilst cooling externally by means of an ice bath. The product which crystallises is filtered off, washed with water (4× 100 cc.) and dried to give 6,7-methylenedioxy-3,4-dihydroisothiocarbostyril (66 g.) melting at 216° C.

2,(3,4 - methylenedioxyphenyl)ethylisothiocyanate can be obtained by reacting 2-(3,4-methylenedioxyphenyl)-ethylamine hydrochloride (79.5 g.) dissolved in water (750 cc.) with thiophosgene (43.7 g.) in methylene chloride (360 cc.), whilst keeping the pH at about 4 by gradually adding 10 N sodium hydroxide solution (107 cc.). The organic phase is then decanted and the aqueous phase is extracted with methylene chloride (200 cc.). The combined organic extracts are washed with N hydrochloric acid (100 cc.) and dried over sodium sulphate. The solvent is evaporated under reduced pressure (30 mm. Hg) to yield an orange-yellow oil which crystallises on cooling. 2-(3,4-methylenedioxy-phenyl)ethyl isothiocyanate (75.2 g.), melting at about 30° C. is thus obtained.

2-(3,4-methylenedioxyphenyl)ethylamine can be prepared in accordance with the procedure described by J. C. Robinson and H. R. Snyder, Organic Synthesis Coll., vol. III, p. 720, J. Wiley Edit. (1955).

EXAMPLE 26

A mixture of 7-chloro-1-methylthio-3,4-dihydroisoquinoline hydroiodide (11.5 g.), 7.8 N hydroiodic acid (4.7 g.) and 2-diethylamino-ethylamine (4.3 g.) in ethanol (100 cc.) is heated for 1 hour 30 minutes. After cooling, the product which crystallises is filtered off. The crystals are washed with diethyl ether (2× 25 cc.) and dried. Crystals (12.5 g.) are thus obtained which are suspended in water (100 cc.) and methylene chloride (100 cc.). The mixture is rendered alkaline by addition of 10 N sodium hydroxide solution (5 cc.). The organic phase is decanted and the aqueous phase is extracted with methylene chloride (50 cc.). The combined organic extracts are washed with water (50 cc.). and dried over sodium sulphate. The volatile products are evaporated under reduced pressure (30 mm. Hg) to yield a brown oil (7 g.) which is dissolved in acetonitrile (60 cc.). A 4 N ethereal solution of hydrochloric acid (13 cc.) is then added. The product which crystallises is filtered off and washed with acetonitrile (10 cc.) followed by diethyl ether (2× 10 cc.). After drying, crystals (6.8 g.) melting at 206° C. remain. They are dissolved in acetonitrile (210 cc.) under reflux, the solution is cooled to 35° C. and diethyl ether (100 cc.) is added. After cooling the crystalline product is separated and washed with diethyl ether (10 cc.) to give 1-(2-diethylamino-ethylamino)-7-chloro-3,4-dihydroisoquinoline dihydrochloride (6.3 g.) melting at 206–207° C.

7-chloro-1-methylthio - 3,4-dihydroisoquinoline hydroiodide employed as starting material can be obtained by adding methyl iodide (32 g.) to a solution of 3,4-dihydro-7-chloroisothiocarbostyril (14.9 g.) in acetone (240 cc.). After 24 hours at ambient temperature, the product which has crystallised is filtered off; 1-methylthio-7-chloro-3,4-dihydroisoquinoline hydroiodide (13.6 g.) is thus obtained.

3,4-dihydro-7-chloro-isothiocarbostyril can be prepared in the following manner:

2-(4-chlorophenyl)ethyl isothiocyanate (30 g.) is added gradually at 80° C. to a suspension of finely ground aluminum chloride (200 g.) in n-heptane (210 cc.). After decanting the heptane, the mixture is poured onto crushed ice (1000 g.) and methylene chloride (200 cc.). Further methylene chloride (250 cc.) is added and the organic phase is separated. The remainder is again extracted with methylene chloride (200 cc.).

The combined organic phases are washed with water (250 cc.) and dried over calcium chloride. The solvent is evaporated under reduced pressure (30 mm. Hg), and the partially crystalline residue which remains is triturated with carbon tetrachloride (50 cc.). The crystalline product is filtered off and washed with carbon tetrachloride (4× 15 cc.) and diethyl ether (15 cc.) to give yellow crystals of 3,4-dihydro-7-chloroisothiocarbostyril (7.6 g.) melting at 185° C.

2-(4-chlorophenyl)ethyl isothiocyanate can be obtained by reacting 2-(4-chlorophenyl)ethylamine hydrochloride (119 g.) dissolved in water (1000 cc.) with thiophosgene (78 g.) dissolved in methylene chloride (1000 cc.) whilst keeping the pH at about 5–7 by gradually adding 10 N sodium hydroxide solution (170 cc.). The organic phase is then decanted and the aqueous phase is extracted with methylene chloride (2× 250 cc.). The combined organic extracts are washed with water (500 cc.) and dried over sodium sulphate. The solvent is evaporated under reduced pressure (30 mm. Hg), and the residual oil (124.5 g.) is distilled under reduced pressure (0.07 mm. Hg). 2-(4-chlorophenyl)ethyl isothiocyanate (71.4 g.), boiling at 112–120° C. under 0.07 mm. Hg, is obtained.

2-(4-chlorophenyl)ethylamine can be prepared according to the procedure described F. Benington et al., J. Org. Chem. 23, 1979 (1958).

EXAMPLE 27

A solution of 1-methylthio-3,4-dihydroisoquinoline hydroiodide (700 g.), 2-diethylamino-ethylamine (294 g.) and 7.8 N hydroiodic acid (330 cc.) in ethanol (7000 cc.) is heated under reflux for 1 hour. The product which crystallises is filtered off and washed with ethanol (2× 250 cc.) followed by diethyl ether (2× 500 cc.). 1-(2-diethylamino-ethylamino)-3,4-dihydroisoquinoline dihydroiodide (887 g.), melting at 204° C., is thus obtained.

The organic liquors are evaporated under reduced pressure (30 mm. Hg) and the residue is taken up in boiling ethanol (750 cc.). The product which crystallises is filtered off and washed with ethanol (2× 100 cc.) and then with diethyl ether (4× 100 cc.). A further quantity of 1-(2-diethylamino-ethylamino) - 3,4 - dihydroisoquinoline dihydroiodide (166 g.), melting at 202° C., is obtained.

This dihydroiodide (1048 g.) is taken up in water (5000 cc.), methylene chloride (2500 cc.) and 10 N sodium hydroxide solution (420 cc.). The organic layer is separated and the aqueous layer is extracted with methylene chloride (500 cc. followed by 300 cc.). The combined organic extracts are washed with water (1000 cc.) and dried over sodium sulphate (300 g.). The solvent is evaporated under reduced pressure (30 mm. Hg); the residue is dissolved in ethanol (1240 cc.) and a 6 N ethereal solution of hydrochloric acid (700 cc.) is added. The product which crystallises is filtered off and washed with ethanol (200 cc.) and then with acetone (6× 200 cc.). 1-(2-diethylamino-ethylamino)-3,4-dihydroisoquinoline dihydrochloride (606 g.), melting at 233–234° C., is thus obtained.

The present invention includes within its scope pharmaceutical compositions containing, as active ingredient, at least one of the 3,4-dihydroisoquinoline derivatives of general Formula I, or a non-toxic acid addition or quaternary ammonium salt thereof, in association with a pharmaceutical carrier or coating. The invention includes especially such preparations made up for oral, parenteral or rectal administration or as ointments.

Solid compositions for oral administration include tablets, pills, powders, and granules. In such solid compositions the active compound is admixed with at least one inert diluent such as sucrose, lactose or starch. The compositions may also comprise, as is normal practice, additional substances other than inert diluents, e.g. lubricating agents, such as magnesium stearate. Liquid compositions for oral administration include pharmaceutically-acceptable emulsions, solutions, suspensions, syrups and elixirs containing inert diluents commonly used in the art, such as water and liquid paraffin. Besides inert diluents such compositions may also comprise adjuvants, such as wetting, emulsifying and suspending agents, and sweetening, flavouring and aromatizing agents. The compositions according to the invention, for oral administration, also include capsules of absorbable material such as gelatin containing the active substance with or without the addition of diluents or excipients.

Preparations according to the invention for parenteral administration include sterile aqueous or non-aqueous solutions, suspensions or emulsions. Examples of non-aqueous solvents or vehicles are propylene glycol, polyethylene glycol, vegetable oils, such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

Compositions for rectal administration are suppositories which contain, in addition to the active substance, excipients such as cacao butter or a suitable wax base.

The percentage of active ingredient in the compositions of the invention may be varied, it being necessary that is should constitute a proportion such that a suitable dosage shall be obtained. The dosage depends on the desired therapeutic effect, on the route of administration and on the duration of the treatment. In therapy the compositions when administered orally to an adult patient should generally give doses between 25 mg. and 250 mg. of active substance per day when used as anti-tussive agent, or doses between 100 mg. and 1000 mg. of active substance per day when used as antifibrillating agents.

The following example illustrates pharamaceutical compositions according to the invention.

EXAMPLE 28

Tablets containing 25 mg. of active product and having the following composition are prepared according to the usual technique:

|  | G. |
|---|---|
| 1-(2-diethylamino-ethylamino)-3,4-dihydroisoquinoline dihydrochloride | 0.032 |
| Starch | 0.085 |
| Precipitated silica | 0.030 |
| Magnesium stearate | 0.003 |

We claim:
1. A 3,4-dihydroisoquinoline of the formula:

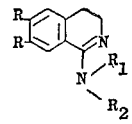

wherein one of $R_1$ and $R_2$ is hydrogen, alkyl of 1 to 5 carbon atoms, monohydroxyalkyl of 1 to 5 carbon atoms, or dialkylaminoalkyl of 1 to 5 carbon atoms in each alkyl, and the other is hydrogen or both $R_1$ and $R_2$ are alkyl of 1 to 5 carbon atoms, and the two radicals R are each hydrogen or methoxy or together are methylenedioxy provided that, when $R_1$ and $R_2$ are both hydrogen, the radicals R are hydrogen or together are methylenedioxy, and non-toxic acid addition salts thereof.

2. 1-(2-diethylamino-ethylamino)-3,4-dihydroisoquinoline and non-toxic acid addition salts thereof.

3. 1-amino-3,4-dihydroisoquinoline and non-toxic acid addition salts thereof.

4. 1-(2-diethylamino-propylamino) - 3,4 - dihydroisoquinoline and non-toxic acid addition salts thereof.

5. A compound of claim 1, herein each R is hydrogen, $R_1$ is hydrogen, and $R_2$ is hydrogen or dialkylaminoalkyl.

6. A compound of claim 1, wherein one of $R_1$ and $R_2$ is hydrogen.

7. A compound of claim 1, wherein $R_1$ and $R_2$ are each alkyl.

8. A compound of claim 1, wherein each R is hydrogen.

(References on following page)

References Cited

UNITED STATES PATENTS

| | | | |
|---|---|---|---|
| 2,593,798 | 4/1952 | Robinson | 260—286 |
| 2,612,503 | 9/1952 | Ullyot | 260—288 |
| 2,666,059 | 1/1954 | Davis et al. | 260—288 |
| 2,700,040 | 1/1955 | Ullyot | 260—286 |
| 2,719,158 | 9/1955 | Druey | 260—286 |
| 3,101,338 | 8/1963 | Robinson | 260—268 |
| 3,133,926 | 5/1964 | Kuehne | 260—286 |
| 3,277,085 | 10/1966 | Aebl et al. | 260—288 X |
| 3,362,956 | 1/1968 | Archer | 260—268 |
| 3,557,120 | 1/1971 | Archer et al. | 260—288 R |

OTHER REFERENCES

Mohunta et al., Jour. Chem. Soc. (London) vol. 1934, pp. 1263-4.

Yamasaki et al., Jour. Pharm. Soc. (Japan), vol. 82, pp. 352-5 (1962).

DONALD G. DAUS, Examiner

U.S. Cl. X.R.

260—243 B, 247.1, 247.5 B, 256, 268 R, 268 BQ, 268 CN, 283 CN, 283 S, 283 SY, 286 Q, 287 R, 288 R, 288 A, 390.5; 424—250, 258.